United States Patent [19]

Bertsche et al.

[11] Patent Number: 5,577,974
[45] Date of Patent: Nov. 26, 1996

[54] CONTROL FOR A MOTOR VEHICLE CHANGE-SPEED GEARBOX AUTOMATIC SELECTOR DEVICE

[75] Inventors: Bernd Bertsche, Tuttlingen; Ludger Kortenjann, Fellbach, both of Germany

[73] Assignee: Mercedes-Benz AG, Germany

[21] Appl. No.: 525,094

[22] Filed: Sep. 8, 1995

[30] Foreign Application Priority Data

Sep. 15, 1994 [DE] Germany .................. 44 32 850.8

[51] Int. Cl.⁶ ............................. F16H 61/28; F16H 61/06
[52] U.S. Cl. ........................ 475/120; 475/128; 477/143; 477/155
[58] Field of Search ................................. 475/116, 118, 475/120, 122, 128; 477/79, 80, 143, 155; 74/335

[56] References Cited

FOREIGN PATENT DOCUMENTS

| 4132873C2 | 10/1991 | Germany. |
| 4117736C1 | 5/1992 | Germany. |
| 2260172 | 9/1992 | United Kingdom. |

*Primary Examiner*—Khoi Q. Ta
*Attorney, Agent, or Firm*—Evenson, McKeown, Edwards & Lenahan P.L.L.C.

[57] ABSTRACT

An arrangement for controlling an automatic selector device of a change-speed gearbox has two selecting connections engageable alternately by selecting actuators operated by pressure medium can be actuated into two non-transient and two transient selector conditions. This alternate engageability is provided by an electronic control unit by way of just one electromagnetic control valve. The arrangement also uses three pressure systems and two multi-way valve arrangements.

8 Claims, 3 Drawing Sheets

CONTROL FOR A MOTOR VEHICLE CHANGE-SPEED GEARBOX AUTOMATIC SELECTOR DEVICE

BACKGROUND AND SUMMARY OF THE INVENTION

The present invention relates to an arrangement for controlling an automatic selector device of a change-speed gearbox of a motor vehicle, comprising two selecting elements, each comprising a selecting actuator operatable by pressure medium and usable for engagement and an associated frictional selecting connection (clutch or brake) disengageable again by spring force.

DE 41 17 736 C1 shows an arrangement in which the first multi-way valve arrangement, which is connected to the pressure system that can be put under system pressure and to the return line, can be switched into one of its end positions by a spring return and into its other position by the control pressure of an electromagnetic control valve that can be activated by the electronic control unit. This also applies to the second multi-way valve arrangement, which is connected to the selecting actuators and the two other pressure systems and has associated spring returns and a second electromagnetic control valve connected thereto. The two-times-two possible positions of these four valve arrangements define the four selector conditions, i.e two non-transient and two transient. These selector conditions can be selected in any desired sequence by the control unit using the two electromagnetic control valves.

DE 41 32 873 C2 describes an automatic selector device of a change-speed gearbox of the epicyclic type which operates with a frictional selector (i.e, clutch or brake) which can be engaged by a selecting actuator of the axial piston type and is located between two transmission elements which can rotate relative to one another. A selector valve which applies pressure to the selecting actuator and has an electromagnetic switch-over control valve, is controllable by an electronic control unit for switching over the selector valve. Both the selector valve and the switch-over control valve can each be switched between a rest position selectable by spring force and a working position. The selecting actuator is connected in the rest position of the selector valve to a pressure-relieved null connection whereas, in the working position, it is connected to a system-pressure line carrying a controlled system pressure. A selector-valve control connection used for the switch-over to the rest position is connected in the rest position of the switch-over control valve to a pressure-relieved null connection. In the working position, the switch-over control valve is connected to a control-pressure feed line carrying a control pressure.

In this latter known selector device, care is taken to ensure that the selecting actuator actuated at a particular time remains subjected to working pressure even if the electric power supply fails. When the engine is switched off, the selector device should assume a position such that, when the engine is restarted, the selecting actuators remain unpressurized. For this purpose, the arrangement in the known selector device is such that the selector valve can also be actuated into its rest position by the control pressure of the switch-over control valve and can be actuated into its working position by a control pressure dependent on the pressure of the selecting actuator and has control connections for this purpose. Moreover, the switch-over control valve is moved into its working position only in phases whereas, in the non-transient condition, i.e. in the completely engaged and in the completely disengaged condition, of the selector it is in its rest position.

In this known device, a control valve has a valve connection for a control pressure line leading to the control connection of the selector valve for the purpose of actuating it into its working position, a valve connection for a control pressure line leading to the control connection of the selector valve for the purpose of actuating it into the rest position, a valve connection for a control pressure line leading to the switch-over control valve and a valve connection for pressure relief. The control valve can be switched between a rest position, on one hand, in which the valve connection for the control pressure line for actuating the selector valve into its rest position is connected to the valve connection for pressure relief whereas the valve connection for the control pressure line for actuating the selector valve into its working position is connected to the valve connection for the control pressure line leading to the switch-over control valve, and a working position, on the other hand, in which the valve connection for the control pressure line for actuating the selector valve into the rest position is connected to the valve connection for the control pressure line leading to the switch-over control valve and the valve connection for the control pressure line for actuating the selector valve into its working position is connected to the valve connection for pressure relief. The control valve is switched over in such a way, as a function of the condition of the selector, that, in one non-transient condition of the selector, the valve connection of the control valve for the control pressure line leading to the switch-over control valve is in each case necessarily connected to the valve connection for the control pressure line for switching the selector valve into the position in which it moves the selector into the other non-transient condition.

In this known selector device, the switch-over control valve is always in its rest position in the non-transient condition of the selector apparatus. As a result, a failure of the electronics or of the power does not change anything as regards the selector condition. In the disengaged condition of the selector apparatus, the selector valve is held in its rest position by spring force and, in the engaged condition, is held in its working position by the self-retention effect of the relevant control pressure, which is dependent on the pressure of the selecting actuator. As a function of the respective instantaneous non-transient condition of the selector apparatus, the control valve is always moved in advance into that position in which, on excitation of the switch-over control valve, the selector valve will be switched into the position for the other selector condition, i.e. not the instantaneous non-transient selector condition. When the engine is switched off, the pressure supply is also switched off, and as a result the selector valve and the control valve are also actuated into the respective rest position by spring force. Accordingly, the selecting actuators remain unpressurized when the engine is restarted.

The gears of an automatic speed-change gearbox are selected by the selective activation of frictional selecting connections (e.g., clutches, brakes). A distinction can be drawn between two conditions: where the selecting connections are fully engaged or disengaged (non-transient phase; gear selected) or where they are engaged or disengaged in a defined manner for a gear change (selecting phase). In more recent automatic transmissions, the selection signals for activation are output by an electronic control unit. The hydraulic part of the control system is likewise assigned certain logical functions and furthermore serves to produce power for the selecting actuators for the engagement of the frictional selecting connections.

In an arrangement for controlling an automatic selector device of a change-speed gearbox, two frictional selecting connections can be engaged and disengaged in a controlled manner, in particular alternately, or their selecting actuators can be connected to the pressure system that can be put under system pressure or to the pressure-relieved return line or directly to a pressure-medium collecting tank. Here, the selecting actuator of the selecting connection to be engaged can be subjected to a controlled working pressure and the selecting actuator of the selecting connection to be disengaged can be subjected to a controlled outlet pressure. To construct a control system for the automatic selector device of a complete multi-speed change-speed gearbox, a correspondingly large number of arrangements, each with two alternately operating selecting connections, are thus required.

An object of the present invention is to provide a control system for the automatic selector device of a multi-speed change-speed gearbox which is distinguished by a small constructional outlay for a given number of forward gears.

The foregoing object has been achieved according to the present invention in an arrangement for controlling an automatic selector device by providing that the control pressure for the first multi-way valve arrangement, which is operatively associated with the pressure system subjectable to system pressure and to the return line, is one of equal to and proportional to a difference between pressures in the selecting elements. In the second and fourth transient selector conditions, the working pressure is controllable with a rising characteristic from a low initial value and the outlet pressure is controllable with a falling characteristic from a high initial value. The working pressures intersect with variations thereof with respect to time. The first multi-way valve arrangement is subjected to control pressure in a direction of the pressure difference so that, at the end of the transient selector condition, the first multi-way valve arrangement is in a position in which the selecting element connected to the pressure system for the working pressure during the transient selector condition is connected in a subsequent non-transient selector condition to the pressure system subjectable to system pressure. In a deenergized and unpressurized condition, the multi-way valve arrangements are held continually by respective spring returns in that position in which one and the same predetermined selecting element is connected to the pressure system subjectable to system pressure, and the second multi-way valve arrangement which is associated with the selecting elements is actuatable by the control pressure of the connected electromagnetic control valve into position thereof corresponding to the second transient selector condition and, by the spring returns into a position thereof corresponding to the third non-transient selector condition.

In the arrangement according to the invention, only a single electromagnetic control valve controllable by the electronic control unit is required to control the two non-transient selector conditions and the two transient selector conditions—that is, in total, to control four selector conditions when changing the two selecting elements. As a result, the constructional outlay for a control system with a required number of n arrangements in accordance with the present invention is considerably reduced, namely by n electromagnetic control valves.

The present invention provides an interrelationship between two multi-way valve arrangements as regards their respective starting positions in the deenergized and unpressurized condition and the automatic switching over of the first multi-way valve arrangement, which is connected to the pressure system that can be put under system pressure and to the return line, as a function of the difference between the pressures in the two selecting actuators. This ensures that the four selector conditions always occur in the same sequence and can be controlled simply by the change in level and duration of a single binary control signal used to switch over the second multi-way valve arrangement which is connected to the selecting actuators.

The electromagnetic control valve influenced by the electronic control unit is, in its deenergized initial position, in both non-transient selector conditions. Consequently, if the electronic control unit fails during the journey, the instantaneous non-transient condition is maintained, i.e. the respectively selected gear is retained. Thus, the triggering of any critical driving conditions in the event of this malfunction is prevented.

The second multi-way valve arrangement, the multi-way valve arrangement connected to the selecting actuators and in the form of an individual multi-way valve, has a separately assigned position for each of the two transient selector conditions. The valve can be switched into this position by the electromagnetic control valve in dependence on two position control valves. One position control valve is connected to the electromagnetic control valve and operates as a function of the position of the first multi-way valve arrangement, the multi-way valve arrangement connected to the pressure system that can be put under system pressure and to the return line. The other position control valve operates in dependence on a selector valve which is connected, inter alia, to the selecting elements.

The position control valve connected to the electromagnetic control valve and the first multi-way valve arrangement can further be combined to give a single multi-way valve.

It is furthermore within the scope of the present invention for the selector valve connected to the selecting elements and the dependent position control valve to be combined structurally in a way which provides a single multi-way valve. Therefore, a total of only two multi-way valves is needed for the first and the second multi-way valve arrangement, resulting in substantial structural simplification.

In another embodiment of the arrangement for controlling an automatic selector device according to the present invention, a two-position multi-way selector valve connected to the selecting actuators and a two-position multi-way control valve connected to the pressure systems for the working pressure and the outlet pressure are used for the second multi-way valve arrangement.

This other embodiment is therefore distinguished by shorter directional control valves of the axial-piston type which can often be accommodated in a more favorable manner in a compact control casing and guided with greater precision in axially displaceable fashion.

In order to ensure in this second embodiment that the control valve connected to the pressure systems for the working pressure and the outlet pressure is not switched over before the completion of the transient selector condition in which the selecting actuator connected to the return line in the first selector condition is subjected to the outlet pressure, a self-retention function is provided. The control valve connected to the pressure systems for the working pressure and for the outlet pressure and the dependent position control valve for the retention pressure can, in a structurally simplified way, be combined into a single multi-way valve. Likewise, the selector valve connected to the selecting actuators and the dependent position control valve for the retention pressure can, also in a structurally simplified way, be combined to give a single multi-way valve.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
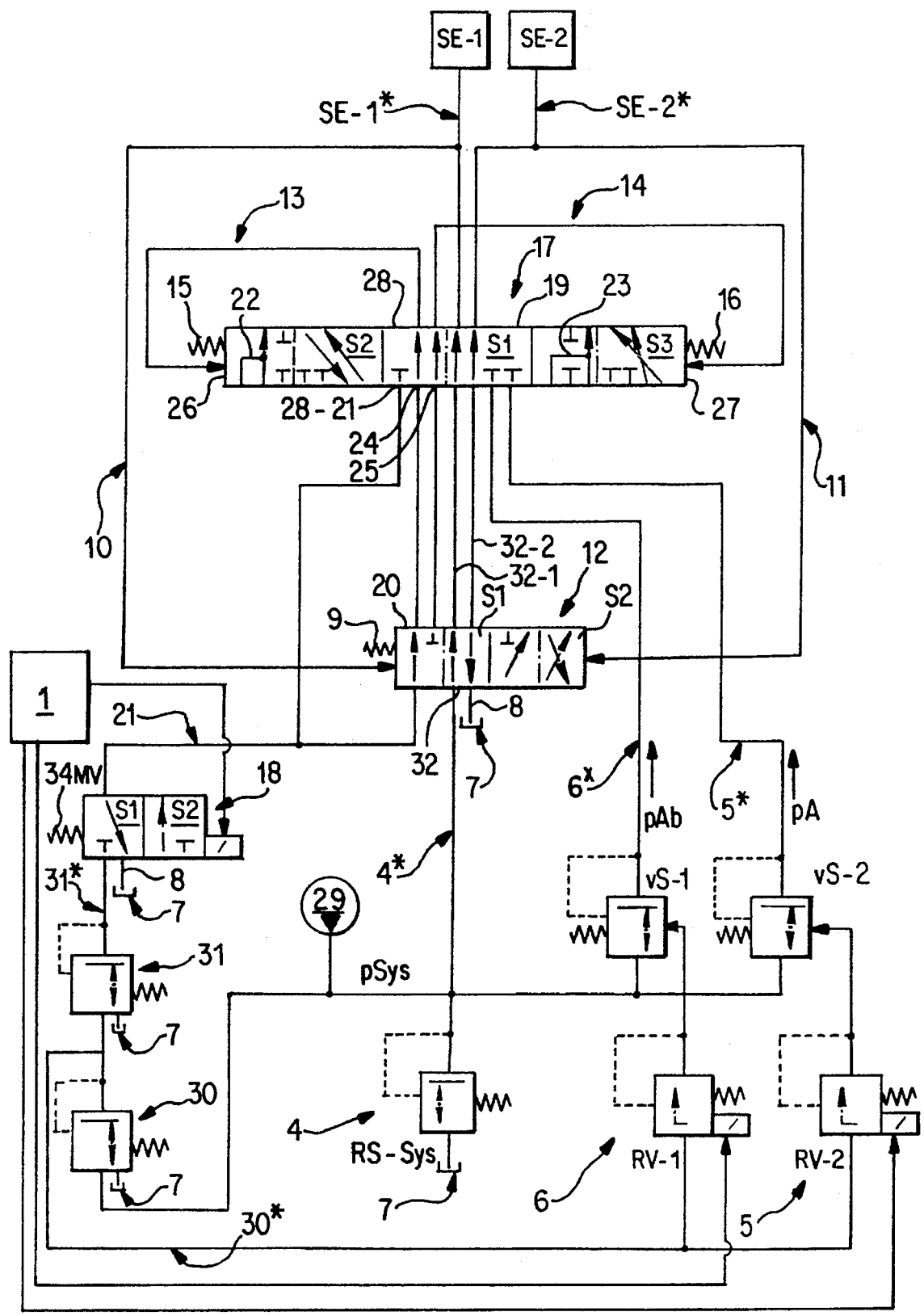
FIG. 1 is a block diagram of an arrangement for controlling an automatic selector device according to a first embodiment of the present invention.
Figure 2:
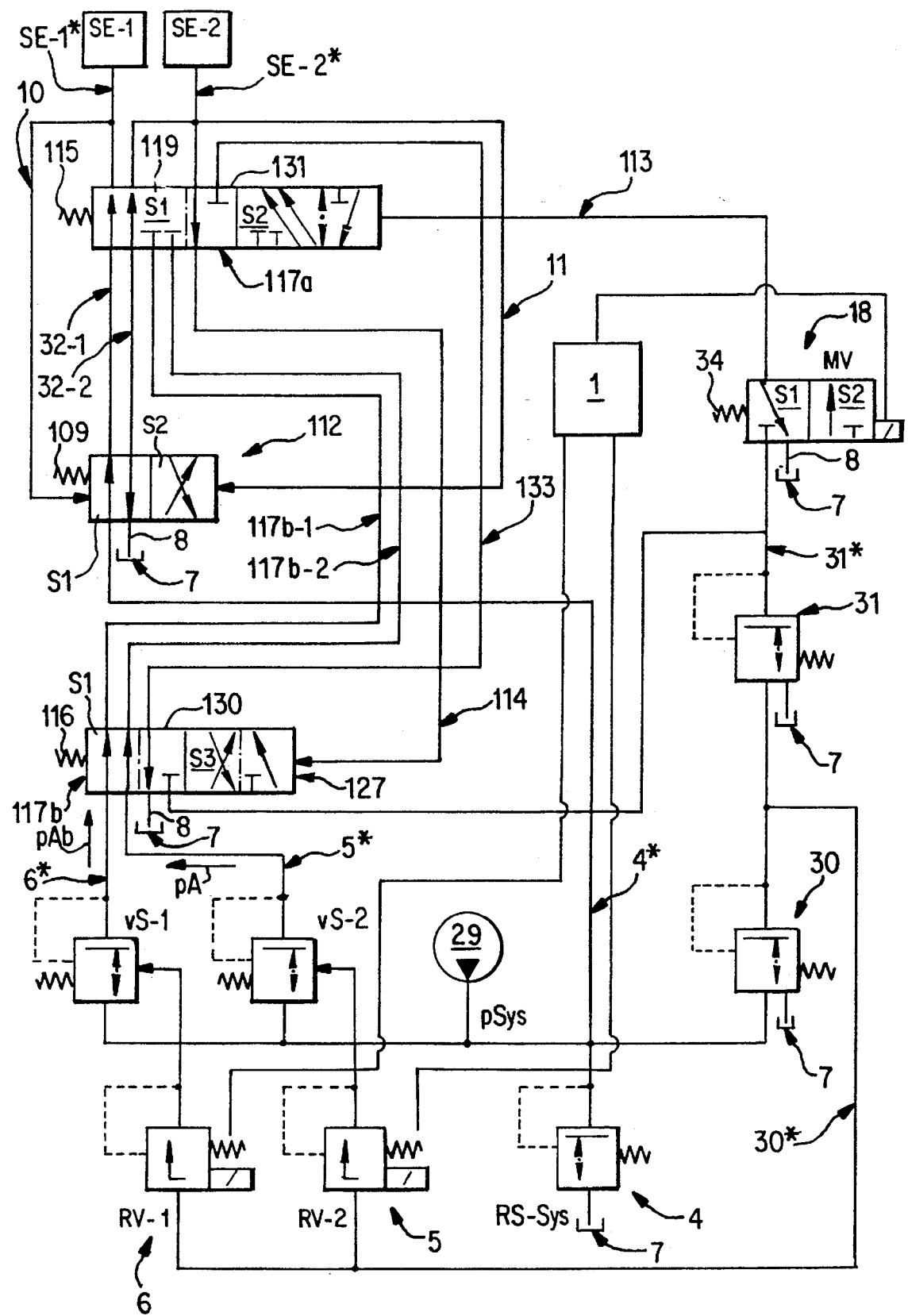
FIG. 2 is a block diagram of an arrangement for controlling an automatic selector device according to a second embodiment of the present invention.

Referring both to FIGS. 1 and 2, in a motor-vehicle change-speed gearbox of, for example, the epicyclic type, two selecting elements SE-1 and SE-2 are alternately engaged and disengaged when a gear change is performed. One selecting element comprises a known frictionally-engaging selecting connection (clutch or brake) between two transmission elements which can rotate relative to one another and an associated selecting actuator. The latter is used to engage the selecting connection by pressurization, and a spring return in combination with pressure relief is used to disengage the selecting connection.

To pressurize the selecting elements SE-1 and SE-2, a pressure system 4 which can be put under a system pressure pSys, a pressure system 5 which can be put under a controllable working pressure pA, and a pressure system 6 which can be put under a controllable outlet pressure pAb are used.

Pressure system 4 is fed by a hydraulic rotary positive-displacement pump 29 which is driven by the engine of the motor vehicle and delivers into a system pressure line 4* in which an essentially constant high system pressure pSys is maintained by a connected main pressure control valve RS-Sys. The system pressure line 4* is connected to a pilot-controlled pressure control valve VS-2 of pressure system 5, to a pilot-controlled pressure control valve VS-1 of pressure system 6, to a first pressure-reducing valve 30 and to a first multi-way valve arrangement 12 (FIG. 1) or 112 (FIG. 2).

Pressure-reducing valve 30 maintains a medium system pressure, reduced relative to the system pressure pSys, in a connected pressure line 30* which is connected to an electromagnetically controlled pilot control valve RV-2 of pressure system 5, to the electromagnetically controlled pilot control valve RV-1 of pressure system 6 and to a second pressure-reducing valve 31. The second pressure-reducing valve 31 maintains a bottom system pressure, reduced further relative to the medium system pressure, in a connected pressure line 31*, which is connected to an electromagnetically controlled 3/2-way control valve 18.

Figure 3:
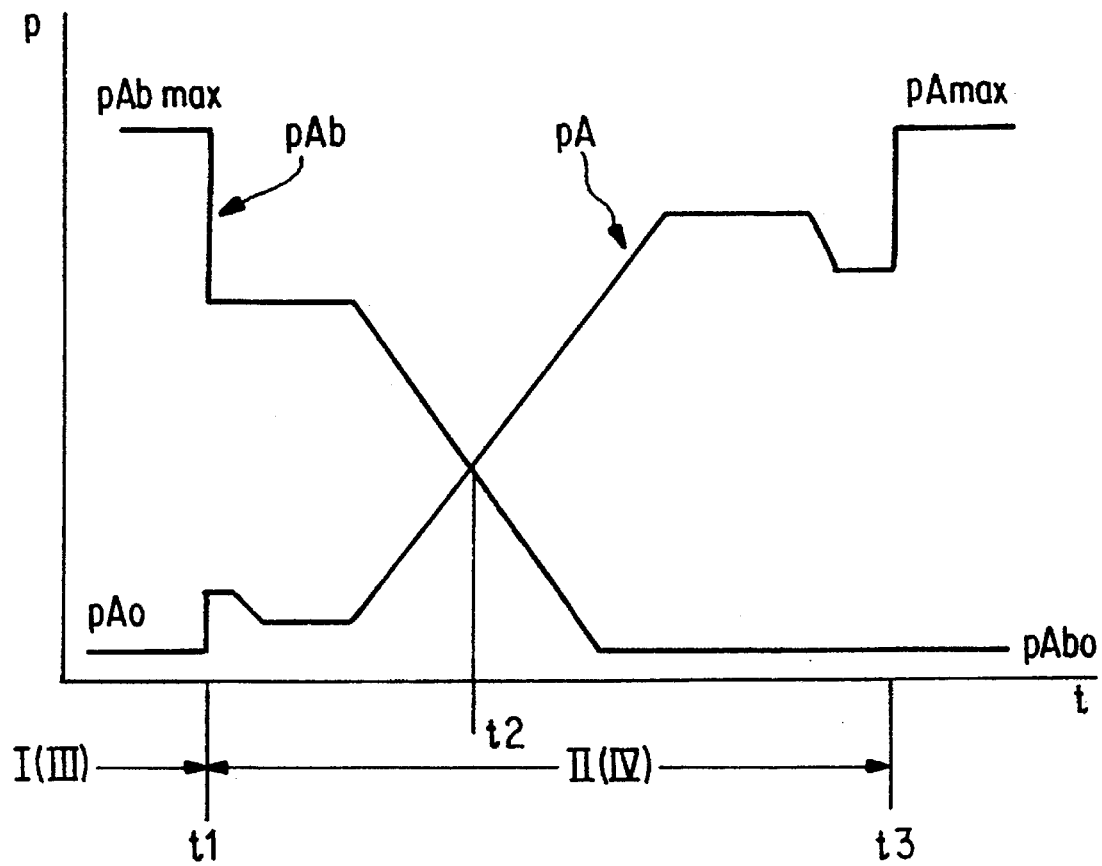
FIG. 3 is a graph of the respective pressure variation in the selecting elements during a transient transient selector condition in the arrangements shown in FIGS. 1 and 2.

The pilot control valve RV-2 of pressure system 5 is controlled by an electronic control unit. In accordance with the control pressure, pressure control valve VS-2 is made to set, starting from a low initial value pAo, a working pressure pA in a connected pressure line 5* with a characteristic which rises with time t up to an upper maximum value pA-max, as shown in FIG. 3, during a transient selector condition.

The pilot control valve RV-1 of pressure system 6 is likewise controlled by the electronic control unit. In accordance with the control pressure, pressure control valve VS-1 is made to set starting from a high initial value pAb max, an outlet pressure pAb in a connected pressure line 6* with a characteristic which falls with time t to a lower final value pAbo, crossing the characteristic of the working pressure pA, as shown in FIG. 3, during a transient selector condition.

The rotary positive-displacement pump 29 can draw in hydraulic pressure medium from a storage tank 7, to which a return line 8 branching off the first multi-way valve arrangement 12 or 112 is led back. The associated valve connection of the multi-way valve arrangement 12 or 112 can also open directly into the collecting tank 7.

The electromagnetic control valve 18 is held by a spring return 34 in its end position S1, in which pressure line 31* is shut off and a control pressure line 21 (FIG. 1) or 113 (FIG. 2) is connected to the return line 8. The control valve 18 can be switched by the electronic control unit into a position S2 in which pressure line 31* is connected to the control pressure line 21 (FIG. 1) or 113 (FIG. 2) and the return line 8 is shut off.

Embodiment of FIG. 1

The first multi-way valve arrangement 12 has a 4/2-way control valve 32 which is connected to the system pressure line 4* and to the return line 8 and which is also connected, by two pressure lines 32-1 and 32-2, to a 6/3 way selector valve 19 of a second multi-way valve arrangement 17. The first multi-way valve arrangement 12 furthermore has a 3/2 -way position control valve 20 which connects control pressure line 21 branching off from the electromagnetic control valve 18 alternately to two valve connections 24, 25 of a position control valve 28 of the second multi-way valve arrangement 17. The selecting elements SE-1 and SE-2 are each connected by a working pressure line SE-1* and SE-2* to the selector valve 19, to which the pressure lines 5*, 6* of the respective pressure systems 5, 6 are also connected.

In the unpressurized condition, the control valve 32 is held by a spring return 9 in one end position S1, in which pressure line 32-1 is connected to the system pressure line 4* and pressure line 32-2 is connected to the return line 8.

In the position corresponding to position S1, the position control valve 20, which is combined with the control valve 32 as a 7/2-way valve, connects control pressure line 21 to the valve connection 24 of position control valve 28.

A respective control pressure line 10, 11 branches off from each of the working pressure lines SE-1*, SE-2* to the first multi-way valve arrangement 12 to switch the control valve 32 between the end position S1 and a position S2 as a function of the difference between the pressures in the selecting elements SE-1 and SE-2. In position S2, one pressure line 32-1 is connected to the return line 8 and the other pressure line 32-2 is connected to the system pressure line 4*. In its position corresponding to position S2, the position control valve 20 connects control pressure line 21 to the valve connection 25 of position control valve 28.

The selector valve 19 can be fixed by spring returns 15, 16 in a central position 51 in which working pressure line SE-1* is connected to pressure line 32-1, working pressure line SE-2* is connected to pressure line 32-2 and pressure lines 5* and 6* are shut off.

Position control valve 28, which is combined with the selector valve 19 into a single 11/3-way valve, has another valve connection 28-21, connected directly to control pressure line 21, and two valve connections, each connected to a respective control pressure line 13, 14. In the position of position control valve 28 corresponding to position S1, valve connection 28-21 is shut off, valve connection 24 is connected to control pressure line 13 and valve connection 25 is connected to control pressure line 14.

By subjecting an actuator 26 to control pressure via control pressure line 13, the selector valve 19 can be switched into a second position S2. In that position, pressure lines 32-1 and 32-2 are shut off, working pressure line SE-1* is connected to the pressure line 6 for the controlled outlet pressure pAb of pressure system 6 and working pressure line SE-2* is connected to the pressure line 5* for the controlled working pressure pA of pressure system 5. In the position of position control valve 28 corresponding to position S2, control pressure line 13 is connected, via a valve passage 22, to valve connection 28-21 and thereby directly to control pressure line 21 to provide a self-retention function.

By subjecting an actuator 27 to control pressure, via control pressure line 14, the selector valve 19 can be switched into a third position S3. In that position, pressure lines 32-1 and 32-2 are likewise shut off, working pressure line SE-1* is connected to the pressure line 5* for the controlled working pressure pA of pressure system 5 and working pressure line SE-2* is connected to the pressure line 6* for the controlled outlet pressure pAb of pressure system 6.

In the position of position control valve 28 corresponding to position S3, control pressure line 14 is connected via a valve passage 23 to valve connection 28-21 and thereby directly to control pressure line 21 to provide a self-retention function.

Change from the first selector condition I (non-transient) to the second selector condition II (transient) will now be described. In the deenergized and unpressurized condition, the first multi-way valve arrangement 12, the second multi-way valve arrangement 17 and control valve 18 are in their respective initial positions S1. As a result, selecting element SE-1 is connected to the pressure system 4 that can be put under the high system pressure pSys, and selecting element SE-2 is connected to the return line 8.

This initial setting gives the non-transient selector condition I with the engine running and the rotary positive-displacement pump 29 driven as a result, such that, under the high system pressure pSys, selecting element SE-1 is in its completely engaged position and switching element SE-2 is relieved of pressure and is thus completely disengaged.

The non-transient selector condition I is brought to an end by switching control valve 18 into its position S2 at time t1 (FIG. 3) by the electronic control unit. Actuator 26 is subjected to control pressure via control pressure line 13 and the selector valve 19 is thereby switched into its position S2, whereby selecting element SE-1 is connected to the pressure system 6 for the controlled outlet pressure pAb and selecting element SE-2 is connected to the pressure system 5 for the controlled working pressure pA. The pressures pA and pAb are controlled with intersecting characteristics in accordance with FIG. 3 until, at time t3, selecting element SE-2 is capable of transmitting the full torque on its own by virtue of the level of the working pressure pA.

During this transient selector condition II, approximately at time t2, at which the transmission ability of selecting element SE-2 becomes greater than that of selecting element SE-1, the first multi-way valve arrangement 12 is switched into its position S2. However, this does not change the progress of the control of the intersection of the pressures pAb and pA in the selecting elements SE-1 and SE-2 at all because the selector valve 19 remains in position S2 by virtue of its self-retention function 22.

Change from the second selector condition II (transient) to the third selector condition III (nontransient) is now described. At the end of the second selector condition II, the first multi-way valve arrangement 12 is in its position S2, in which the control valve 32 connects pressure line 4* to pressure line 32-2 and the return line 8 to pressure line 32-1.

The non-transient selector condition III is initiated at time t3 in accordance with FIG. 3 by switching off the excitation of control valve 18. As a result, the selector valve 19 is switched into its initial position S1 by the spring returns 15, 16 and, consequently, selecting element SE-2 is then connected to pressure system 4 via pressure line 32-2, selecting element SE-1 is connected to the return line 8 via pressure line 32-1, and control pressure line 11 is likewise connected to pressure system 4.

The non-transient selector condition III, like the non-transient selector condition I, is thus maintained even if the control unit fails, because control valve 18 is deenergized in any case and the respective control pressure line 11 or 10 exercises a self-retention function.

Change from the third selector condition III (non-transient) to the fourth selector condition IV (transient) is now described. In the non-transient selector condition III, the first multi-way valve arrangement 12 is in position S2 and the second multi-way valve arrangement 17 is in the initial position S1.

The transient selector condition IV is initiated by excitation of control valve 18. Because its control pressure line 21 is connected to actuator 27 of the second multi-way valve arrangement 17 by the position control valve 20 of the first multi-way valve arrangement 12, the multi-way valve arrangement 17 is switched into its position S3. As a result, the selector valve 19 connects selecting element SE-1 to the pressure system 5 for the working pressure pA and selecting element SE-2 to the pressure system 6 for the outlet pressure pAb.

Simultaneously with the excitation of control valve 18, the pressures pA, pAb are controlled in accordance with the intersection characteristic of FIG. 3.

While the second multi-way valve arrangement 17 is held in its position S3 for the entire duration of the transient selector condition IV by its self-retention function 23, the first multi-way valve arrangement 12 is switched into position S1 approximately at time t2, at which time the transmission ability of the engaging selecting element SE-1 becomes greater than that of the disengaging selecting element SE-2.

Change from the fourth selector condition (transient) to the first selector condition I (non-transient) is now described. Towards the end of the transient selector condition IV, the first multi-way valve arrangement 12 is in its initial position S1 and the second multi-way valve arrangement 17 is in its position S3. The transient selector condition IV is ended by switching off the excitation of control valve 18.

The second multi-way valve arrangement 17 is thereby actuated into its initial position S1 by the spring returns 15, 16, with the result that selecting element SE-1 is connected to pressure system 4, and selecting element SE-2 is connected to the return line 8.

This selector condition I, in which selecting element SE-1 is held in its completely engaged position by the high system pressure pSys and selecting element SE-2 is held in its completely disengaged position owing to pressure relief, is maintained even if the electronic control unit fails, because the control valve 18 is deenergized in any case and the control pressure line 10 under system pressure pSys has a self-retention function for the position S1 of the first multi-way valve arrangement 12.

Embodiment of FIG. 2

The first multi-way valve arrangement 112 comprises a single 4/2-way control valve, which is furthermore connected to the return line 8 and, via two pressure lines 32-1 and 32-2, to a 6/2-way selector valve 119 of a second multi-way valve arrangement 117a/117b.

The selector valve 119 is also connected, by two pressure lines 117b-1 and 117b-2, to a 4/2-way control valve 117b of the second multi-way valve arrangement 117a/117b and, by respective working pressure lines SE-1* and SE-2*, to the selecting elements SE-1 and SE-2.

The first control valve 112 is held by a spring return 109 in its initial position S1, in which pressure line 32-1 is connected to the system pressure line 4* and pressure line 32-2 is connected to the return line 8.

Branching off from each of the working pressure lines SE-1* and SE-2* to the control valve 112 is a respective control pressure line 10 and 11 to allow the control valve 112 to be switched between position S1 and position S2 as a function of the difference between the pressures in the selecting elements SE-1 and SE-2. In position S2, pressure line 32-1 is connected to the return line 8 and pressure line 32-2 is connected to the system pressure line 4*.

The selector valve 119 is held by a spring return 115 in its initial position S1, in which pressure line 32-1 is connected to working pressure line SE-1*, pressure line 32-2 is connected to working pressure line SE-2*, and pressure lines 117b-1 and 117b-2 are shut off.

By subjecting its actuator to control pressure, via a control pressure line 113 which branches off directly from the electromagnetic control valve 18, the selector valve 119 can be switched to a position S2 in which pressure lines 32-1 and 32-2 are shut off, working pressure line SE1* is connected to pressure line 117b-1 and working pressure line SE-2* is connected to pressure line 117b-2.

The second control valve 117b, to which also pressure lines 5* and 6* of pressure systems 5 and 6 are connected, is held by a spring return 116 in an initial position S1 in which pressure line 6* is connected to pressure line 117b-1 and pressure line 5* is connected to pressure line 117b-2.

By subjecting its actuator 127 to control pressure via a control pressure line 114, the second control valve 117b can be switched into a position S3 in which pressure line 6* is connected to pressure line 117b-2 and pressure line 5* is connected to pressure line 117b-1.

Control pressure line 114 is connected to a 3/2-way position control valve 131 which is dependent on the position of the second multi-way valve arrangement 117a/117b, and is also connected to working pressure line SE-2* and to a retention-pressure control line 133.

In its position corresponding to position S1, the position control valve 131, which is combined with the selector valve 119 into a single 9/2-way valve, connects control pressure line 114 to working pressure line SE-2*, while, in its position corresponding to position S2, it is connected to the retention-pressure control line 133.

The retention-pressure control line 133 is connected to a 3/2-way position control valve 130 which is dependent on the position of the second multi-way valve arrangement 117a/117b and is also connected to the return line 8 and to the pressure line 31* for the bottom system pressure of pressure-reducing valve 31.

In its position corresponding to position S1, position control valve 130, which is combined with the second control valve 117b into a single 7/2-way valve, connects the retention-pressure control line 133 to the return line 8 and, in its position corresponding to position S3, connects it to pressure line 31*.

Change from the non-transient condition I to the transient condition II will now be described. In the deenergized and unpressurized condition, the first multi-way valve arrangement 112, the selector valve 119, the control valve 117b of the second multi-way valve arrangement 117a/117b and the electromagnetic control valve 18 are in their respective initial positions S1. Consequently, selecting element SE-1 is connected to the pressure system 4 that can be put under high system pressure pSys and selecting element SE-2 is connected to the return line 8.

This initial setting gives the non-transient selector condition I with the engine running and the rotary positive-displacement pump 29 driven as a result, such that, under the high system pressure pSys, selecting element SE-1 is in its completely engaged position and switching element SE-2 is relieved of pressure and is thus completely disengaged.

The non-transient selector condition I is brought to an end by switching control valve 18 into its position S2 at time t1 (FIG. 3) by the electronic control unit.

The selector valve 119 is switched by the control pressure in control pressure line 113 into its position S2. As a result, the selecting element SE-1 is connected to the pressure system 6 for the controlled outlet pressure pAb and selecting element SE-2 is connected to the pressure system 5 for the controlled working pressure pA. The pressures pAb, pA are controlled with intersecting characteristics in accordance with FIG. 3 until, at time t3, selecting element SE-2 is capable of transmitting the full torque on its own by virtue of the level of the working pressure pA.

During this transient selector condition II, during which control pressure line 114 is connected to the return line 8 via the retention-pressure control line 133 and position control valve 130, the control valve 117b remains in its initial position S1. The first multi-way valve arrangement 112 is switched into position S2 approximately at time t2 at which time the transmission ability of the engaging selecting element SE-2 becomes greater than that of the disengaging selecting element SE-1. However, this does not change the progress of the control of the intersection of the pressures pAb, pA in the selecting elements SE-1, SE-2 at all because the selector valve 119 is fixed in its position S2 by the control pressure as long as control valve 18 is excited by the electronic control unit and, as a result, remains in its position S2.

Change from the transient condition II to the non-transient condition III is now also described. At the end of the second selector condition II, the first multi-way valve arrangement 112 is in its position S2, in which pressure line 32-1 is connected to the return line 8 and pressure line 32-2 is connected to the system pressure line 4*.

The non-transient selector condition III is initiated at time t3 in accordance with FIG. 3 by switching off the excitation of control valve 18. As a result, the selector valve 119 is actuated into its initial position S1 by the spring return 115 and, consequently, connects selecting element SE-2 to pressure system 4 and selecting element SE-1 to the return line 8.

In position S1 of the selector valve 119, position control valve 131 connects control pressure line 114 to selecting element SE-2, which is subjected to the system pressure pSys, with the result that the control valve 117b is switched into its position S3. Hence, pressure system 6 is connected to pressure line 117b-2, and pressure system 5 is connected to pressure line 117b-1.

In the non-transient selector condition III, selecting element SE-2 is in this way held in its completely engaged position by the high system pressure pSys. Selecting element SE-1 is held in its completely disengaged position owing to pressure relief. The first multi-way valve arrangement 112 is held in position S1 by the system pressure pSys in control pressure line 11 and the control valve 117b is held in position S3 by the system pressure pSys in control pressure line 114.

The non-transient selector condition III is thus maintained even if the control unit fails because control valve 18 is unpressurized in any case, and the respective control pressure line 11 or 10 exercises a self-retention function.

Change from the third (non-transient) condition III to the fourth (transient) condition IV is now also described. In the non-transient selector condition III, the first multi-way valve arrangement 112 is in position S2. The selector valve 119 of the second multi-way valve arrangement 117a/117b is in the initial position S1. The control valve 117b of the second multi-way valve arrangement 117a/117b is in position S3, and control valve 18 is in position S1.

The transient selector condition IV is initiated by excitation of control valve 18. Thereby, the selector valve 119 is switched into its position S2 by the control pressure in control pressure line 113 and, consequently, connects selecting element SE-1 to the pressure system 5 for the working pressure pA and connects selecting element SE-2 to the pressure system 6 for the outlet pressure pAb.

Simultaneously with the excitation of control valve 18, the pressures pA and pAb are controlled in accordance with the intersection characteristic of FIG. 3.

In position S3 of the control valve 117b, the retention-pressure control line 133 is connected by position control valve 130 to pressure line 31* and, in position S2 of the selector valve 119, it is connected by position control valve 131 to control pressure line 114. As a result, the control valve 117b is held in its position S3 for the entire duration of the transient selector condition IV even if pressure relief of selecting element SE-2 occurs.

During the transient selector condition IV, in contrast, the first multi-way valve arrangement 112 is switched into its initial position S1 when the transmission ability (pA) of the engaging selecting element SE-1 becomes greater than that of the disengaging selecting element SE-2.

Change from the fourth (transient) condition IV to the first selector (non-transient) I is now also described. Towards the end of the transient selector condition IV, the first multi-way valve arrangement 112 is in its initial position S1. The selector valve 119 of the second multi-way valve arrangement 117a/117b is in its position S2, and the control valve 117b of the second multi-way valve arrangement 117a/117b is in its position S3. The transient selector condition IV is ended by switching off the excitation of control valve 18.

The selector valve 119 is thereby actuated into its initial position S1 by the spring return 115 and, consequently, selecting element SE-1 is connected to pressure system 4 and selecting element SE-2 is connected to the return line 8.

As a result, the non-transient selector condition I is reached, in which selecting element SE-1 is in its completely engaged position under the high system pressure pSys and selecting element SE-2 is in its completely disengaged position owing to pressure relief.

Pressure line 32-2 is connected to the return line 8 by the first multi-way valve arrangement 112 and to control pressure line 114 by position control valve 131. Hence, the control valve 117b is switched into its initial position S1 by the spring return 116.

Also, in this embodiment, the non-transient selector condition I is maintained even if the control unit fails, because the control valve 18 is deenergized in any case and the control pressure line 10 under system pressure pSys has a self-retention function for the position S1 of the first multi-way valve arrangement 112.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for controlling an automatic selector device of a change-speed gearbox of a motor vehicle, comprising two selecting elements, each comprising a selecting actuator operatable by pressure medium and usable for engagement and an associated frictional selecting connection (clutch or brake) disengageable again by spring force, a first pressure system configured to be subjected to a system pressure, a second pressure system configured to be subjected to a controllable working pressure for an engaging one of the selecting elements, a third pressure system configured to be subjected to a controllable outlet pressure for a disengaging one of the selecting elements, a return line leading to a pressure-relieved collecting tank, a first multi-way valve arrangement configured to be switchable between two positions by control pressure in interaction with a spring return and to which both the first pressure system subjectable to system pressure and the return line are connected, a second multi-way valve arrangement configured to be actuatable into at least two positions by control pressure in interaction with a spring return and which is connectable to the first multi-way valve arrangement, to the selecting elements and to the second and third pressure systems and is arranged to assign the pressure systems to the selecting elements such that, in dependence on an electronic control unit for determining the action of the control pressures with respect to time and the respective pressure level of the pressure systems, (i) in a first non-transient selector condition, one selecting element is connected to the first pressure system subjectable to system pressure and the other selecting element is connected to the return line, (ii) in a second transient selector condition, the selecting element connected in the first selector condition to the first pressure system subjectable to system pressure is connected to the third pressure system for the outlet pressure and the other selecting element is connected to the second pressure system for the working pressure, (iii) in a third non-transient selector condition, the selecting element connected in the first selector condition to the first pressure system subjectable to system pressure is connected to the return line and the other selector element is connected to, the first pressure system subjectable to system pressure, (iv) in a fourth transient selector condition, the selecting element connected in the first selector condition to the first pressure system subjectable to system pressure is connected to the second pressure system for the working pressure and the other selecting element is connected to the third pressure system for the outlet pressure, the second multi-way valve arrangement, which is operatively connected to the selecting elements, being in a position maintained by spring returns in the first selector condition, and a connected electromagnetically actuatable control valve being held in the deenergized condition by the control unit, and the second multi-way valve arrangement is configured to be switchable to a position thereof associated with the fourth selector condition by the control unit by outputting of an electrical control signal for the connected electromagnetic control valve, wherein the control pressure for the first multi-way valve arrangement, which is operatively associated with first the pressure system subjectable to system pressure and to the return line, is one of equal to and proportional to a difference between pressures in the selecting elements, in the second and fourth transient selector conditions, the working pressure is controllable with a rising characteristic from a low initial value and the outlet pressure is controllable with a falling characteristic from a high initial value, the working pressures intersecting with variations thereof with respect to time, the first multi-way valve arrangement is subjected to control pressure in a direction of the pressure difference that, at the end of the transient selector condition, the first multi-way valve arrangement is in a position in which the selecting element connected to the second pressure system for the working pressure during the transient selector condition is connected in a subsequent non-transient selector condition to the first pressure system subjectable to system pressure, and, in a deenergized and unpressurized condition, the multi-way valve arrangements are held continually by respective spring returns in that position in which a predetermined one of selecting elements is connected to the first pressure system subjectable to system pressure, and the second multi-way valve arrangement which is associated with the selecting elements is actuatable by the control pressure of the connected electromagnetic control valve into a position thereof corresponding to the second transient selector condition and, by the spring returns into a position thereof corresponding to the third non-transient selector condition.

2. The arrangement according to claim 1, wherein the second multi-way valve arrangement has a three-position multi-way selector valve connected to the selecting elements, to the first multi-way valve arrangement and to the other pressure systems and has two positions, each position assigned to one of the transient selector conditions, and another position for the non-transient selector conditions, the another position being fixable by the spring returns, and further has a position control valve connected to the electromagnetic control valve for the control pressure and a position control valve connected to the actuators of the selector valve, the position control valve being connected to the electromagnetic control valve and operating as a function of a position of the first multi-way valve arrangement, and the position control valve connected to the actuators operating as a function of the position of the selector valve, and the position control valve connected to the actuators has a self-retention function derived directly from the electromagnetic control valve for each of position thereof assigned to the transient selector conditions, and, in the non-transient selector conditions, the actuators are connected alternately to the electromagnetic control valve by the position control valves.

3. The arrangement according to claim 2, wherein the position control valve connected to the electromagnetic control valve and the first multi-way valve arrangement are a single 7/2-way valve.

4. The arrangement according to claim 2, wherein the position control valve connected to the actuators and the selector valve are a single 11/3-way valve.

5. The arrangement according to claim 1, wherein the second multi-way valve arrangement, which is operatively connected to the selecting elements has a two-position multi-way selector valve connected to the selecting elements and a two-position multi-way control valve connected to the second pressure system for the working pressure and the third pressure system for the outlet pressure, the selector valve connected to the selecting elements is connected to the first multi-way valve arrangement and to the control valve connected to the second pressure system for the working pressure and the third pressure system for the outlet pressure, the selector valve connected to the selecting elements being actuatable by a spring return into a position for the non-transient selector conditions and by the control pressure of the electromagnetic control valve into a position for the transient selector conditions, the control valve connected to the second pressure system for the working pressure and to the third pressure system for the outlet pressure being actuatable by a spring return into a position for one transient selector condition and by a control pressure into the position for the other transient selector condition, control pressure for the actuation of the control valve connected to the second pressure system for the working pressure and the third pressure system for the outlet pressure is derived from the pressure in the selecting element which is connected to the pressure system for the working pressure in the transient selector condition associated with that position of the control valve which is actuated by the associated spring return.

6. The arrangement according to claim 5, wherein the control valve connected to the second pressure system for the working pressure and the third pressure system for the outlet pressure has, in a position thereof actuated by the control pressure, a self-retention function which is derived from a retention pressure which, in dependence on two position control valves, is released to act on the actuator of the control valve when both position control valves are in an open position, one position control valve operates in dependence on the control valve connected to the second pressure system for the working pressure and the third pressure system for the outlet pressure and is in the open position when the control valve is in a position thereof actuated by the control pressure, and the other position control valve operates in dependence on the selector valve connected to the selecting elements and is in the open position when the selector valve is in its position for the transient selector conditions.

7. The arrangement according to claim 6, wherein the control valve connected to the second pressure system for the working pressure and the third pressure system for the outlet pressure and the position control valve dependent on the control valve are a single 7/2-way valve.

8. The arrangement according to claim 6, wherein the selector valve connected to the selecting elements and the dependent position control valve are a single 9/2-way valve.

\* \* \* \* \*